United States Patent [19]

Binarsch et al.

[11] Patent Number: 4,930,040
[45] Date of Patent: May 29, 1990

[54] CURRENT REGULATOR FOR INDUCTIVE LOADS

[75] Inventors: Jürgen Binarsch, Haste; Jürgen Bode, Hildesheim; Lutz Danne, Ronnenberg; Norbert Lissel, Seelze, all of Fed. Rep. of Germany

[73] Assignee: WABCO Westinghouse Fahrzeugbremsen GmbH, Hanover, Fed. Rep. of Germany

[21] Appl. No.: 270,993

[22] Filed: Nov. 14, 1988

[30] Foreign Application Priority Data

Dec. 10, 1987 [DE] Fed. Rep. of Germany ....... 3741765

[51] Int. Cl.$^5$ .......................................... H01H 47/32
[52] U.S. Cl. ................................. 361/154; 323/287; 361/187; 361/189
[58] Field of Search ............... 361/152, 154, 159, 160, 361/187, 189; 323/282, 284, 287

[56] References Cited

U.S. PATENT DOCUMENTS

| | | | |
|---|---|---|---|
| 4,620,260 | 10/1986 | Oshizawa et al. | 361/160 |
| 4,633,094 | 12/1986 | Knudsen | 323/287 |
| 4,661,766 | 4/1987 | Hoffman et al. | 323/287 |

Primary Examiner—A. D. Pellinen
Assistant Examiner—Jeffrey A. Gaffin
Attorney, Agent, or Firm—Horst M. Kasper

[57] ABSTRACT

A current regulator for an inductive load especially for a coil of an electromagnetic solenoid valve. The current flow through the coil is regulated and compared by means of an operational amplifying nominal current value. The inductive load comparator is initially controlled by a first conductive diode. A second diode having a higher voltage rating than that of the first diode is rendered conductive whenever the nominal current value in an inductive coil decreases rapidly. The current regulator ensures that the magnetic energy in the inductive load remains unchanged when the nominal current value remains constant or changes in small amounts. When a rapid decrease of the coil current occurs, the second diode is rendered conductive.

10 Claims, 3 Drawing Sheets

CURRENT REGULATOR FOR INDUCTIVE LOADS

FIELD OF INVENTION

This invention relates to a current regulator for inductive loads especially for an electromagnetic coil, and more particularly to an electronic current regulator for a proportional solenoid valve in which the coil current is regulated by a comparator to a predetermined current value in which the inductive coil of the solenoid is normally bridged with a first diode, and in which a second diode having a higher forward breakdown voltage than the first diode (D1) is switched on when a predetermined current value in the coil begins to decay rapidly.

BACKGROUND OF THE INVENTION

The conventional methods of controlling inductive current in especially proportional solenoid valves as well as in inductive switch gear apparatus are well known in the art.

The use of controllers, and/or two-position controllers for alternately transmitting full operating load current and then zero current into the coil of the solenoid valve is shown and disclosed in European patent EP-PS 0 008 509. By interchanging the switching relationship, the average current can be effectively controlled from a zero level to a maximum value.

In order to protect the transistors in the electrical equipment against the inductive current surges during shut-down or opening of the circuit, it is to provide suppressing means to handle the inductive kick such as, using a forward biased conducting diode. Such an arrangement has the advantage that the magnetic field decay of the inductive surge remains stable during inactive operation. The electrical power required for such inductive spikes can be held to relatively small value.

Utilization of a forward biased diode becomes disadvantageous, when the activated solenoid valve is to react rapidly, as the diode impedes the rapid reduction of the magnetic field. It is known from the above patent, that the inductive surge of the circuit can be reduced rapidly by means of a Zener diode. Attention must be paid to the fact that the generated switch-off voltage does not exceed a given value since the switching transistor can be damaged by excess voltage.

The above arrangements may be used for a controlling solenoid valve of a fuel injection system. In this case, only an ON and OFF operation is necessary or required since an injector valve is either fully opened or fully closed.

OBJECTS AND SUMMARY OF THE INVENTION

The invention is specifically concerned with a control for a proportional solenoid valve which may be used in conjunction with an infinite number of intermediate positions. For this reason, the current must be infinitely controlled from a zero level to a maximum value.

The invention has the purpose of defining a current regulator which is capable of metering down a proportional solenoid valve or a magnetic adjustable device, as well as achieving an economical current consumption during a steady state condition or during a slowly changing condition from the selected value.

Accordingly, it is an object of this invention to provide a new and improved current regulator for supplying current to an inductive load in which rapid decay is effectively suppressed to prevent voltage surges.

In accordance with the present invention there is provided a current controller for an inductive load especially for a coil of a solenoid valve, comprising, a coil regulated to a desired nominal current value by means of a comparator and a switch device so that the inductive load is controlled by a first conductive diode and by a second conductive diode which has a higher breakdown voltage than has the first conductive diode so that activated only when a decrease of the nominal current value through the coil exceeds a given threshold value.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
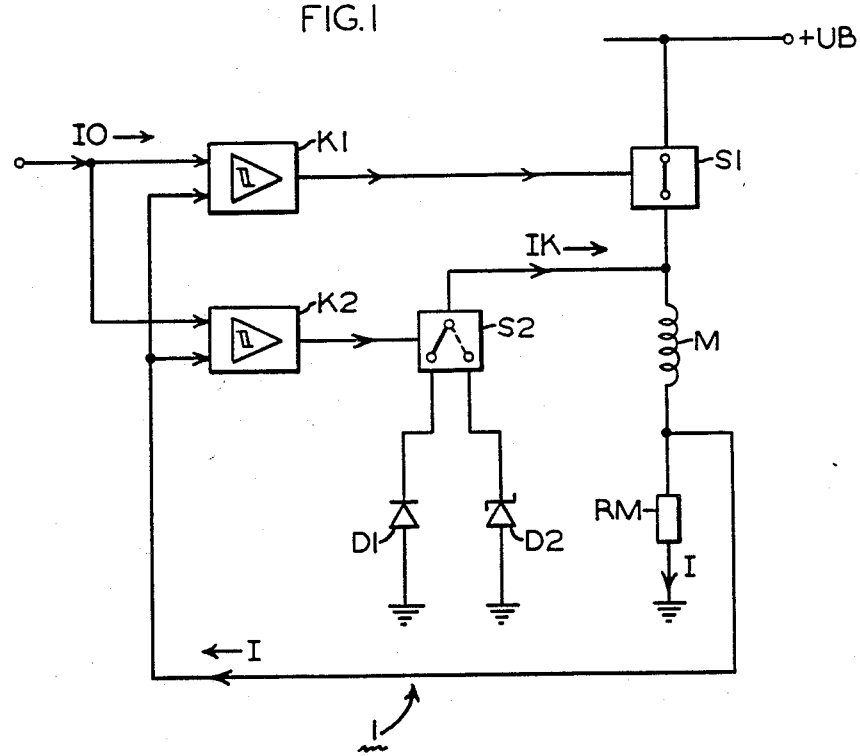
FIG. 1 a block schematic circuit diagram of the current regulator embodying the features of the present invention.

Referring now to the drawings, and in particular to FIG. 1, there is shown a current regulating circuit arrangement generally characterized by numeral 1 for supplying current to an inductive load, such as, an electromagnetic solenoid coil or the like.

As shown, the circuit diagram illustrates a current regulator, including a series switch element S1, a source of operating voltage +UB, an inductive load M, and a precision resistance RM. The switching device S1 is electronically activated by a comparator K1 which takes the form of a differential amplifier.

The nominal value of current I0 and the actual value of current I from the inductive load M are connected to the input terminals of the comparator K1 to control the amount of current supplied to the inductive coil. Both values form the proportional current value. The proportional current for the actual value I is limited by the precision resistance RM.

The output terminal of the comparator K1 normally produces a high or energizing signal as long as the actual current value I is the nominal current value I0. The energizing signal keeps the switch S1 in its closed position so that current flows from voltage source +UB through the solenoid coil M and limiting resistance so that the inductive current I continues to rise. Now as soon as the actual current value I reaches the nominal current value I0, the output signal of the comparator K1 will go to a zero (0) or low level so that the switch S1 will be opened.

At the same time, a reversing switch S2 changes its position to that shown by the dashed line in FIG. 1 so that the circuit is connectable to a first shunting diode D1 and to a second shunting diode D2 is closed and is placed in parallel to the inductive load M. It will be seen that the switch S2 is controlled by a comparator circuit K2 and is subjected to current values similar to those of the comparator K1, namely the nominal current value I0, and the actual current value I of the coil current. The comparator K2, like the comparator K1, is designed as an operational amplifying circuit and functions to react to current changes, especially the lowering of the current I.

Figure 2A:
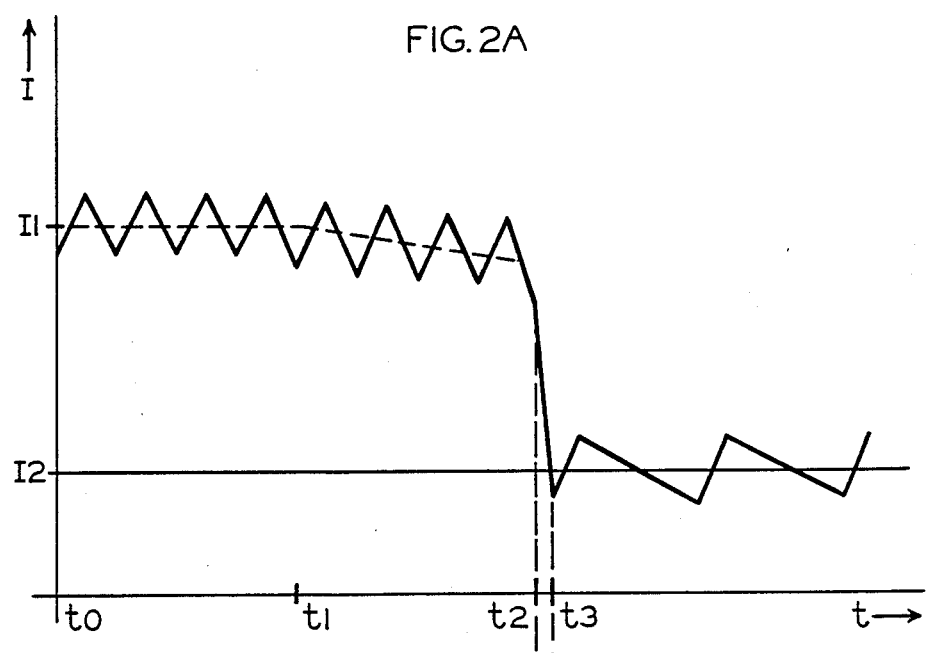
FIGS. 2A, 2B and 2C are graphic curves to be used in the description of the embodiment of FIG. 1 and in understanding the theory of operation of the present invention.
Figure 2B:
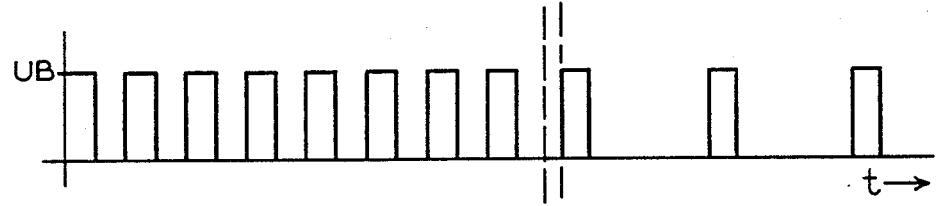
Figure 2C:
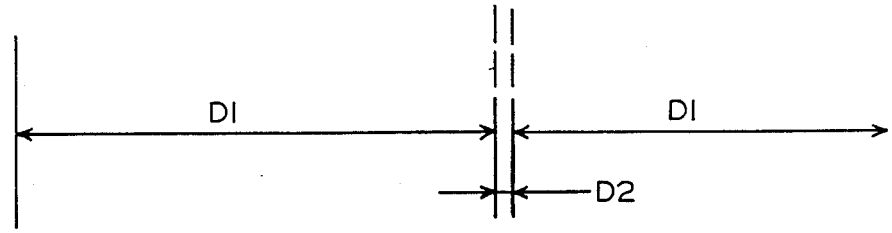

The following is a description of the operation of the current regulator as shown in FIG. 1 and also with reference to the curves shown in FIGS. 2A, 2B and 2C.

During the initial stable operation from time t1 as shown in FIG. 2A, the comparator K1 controls the coil current I at a current value of I1. In this case, switch S1 will be initially closed and then opened in a regular sequence. Thus, during the initial period, the operating voltage UB is switched ON and OFF to form regular or equal pulses which are conveyed to load M as shown in FIG. 2b. To prevent the operating frequency of the switch S1 from being too high, the comparator K1 is provided with hysteresis. Under normal conditions, the switching frequency is between 300 and 2300 Hz.

There is a slight decrease in the normal current value I0 between the time period of t1 to t2 as shown in FIG. 2A. However, the comparator K1 will ensure an adequate level of the coil current I is maintained by slightly lowering the cycling period of switch S1.

During the operating period from time t0 to time t2, it will be seen that the inductive current IK will flow when the switch S1 is opened. This current is produced by the inductive load M and flows through a precision resistor RM as well as through the first shunting diode D1 and the close contacts or the switch S2. Since the first shunting diode D1 has a low voltage drop of about 0.7V, the coil current I will decrease very slowly. This causes the magnetic field of the inductive load M to remain substantially constant. As a consequence, only a relatively moderate amount of energy is consumed by the control device during initial stable changing operations.

Now as soon as the actual current value I0 begins to drop or decrease rapidly, the comparator K2 will sense the sudden change of current. The latter will then generate an output signal which will go high and will switch the reversing switch S2, and the current IK will begin to flow through the second Zener diode D2. The diode D2 has a much higher voltage drop than the diode D1, of about 20V. This makes it possible for the coil current I to decrease rapidly as shown in FIG. 2. That is, during time t2 to the time t3 the current drops to an approximate value of I2. The second diode D2 reduces the shut-off current for the switch S1 to a similar value.

As shown in FIG. 1, the second conductive diode D2 is used as a conventional diode, it is poled in the same direction as diode D1 for providing better compatability and allowing interchangeability. When the diode D2 is operated as a Zener diode, this diode is poled in the opposite direction as shown in FIG. 3.

In viewing FIG. 2a, it will be noted that the coil current I is reduced to a lower value I2 at time t3. It will be seen from FIG. 2b, that the frequency or voltage pulse rate caused by the opening and closing of the switch S1 is decreased. As shown in FIG. 2c, the first diode D1 is operable during the steady state and during minute current changes. Now when there is a rapid or dramatic reduction or decrease of the nominal value I0, the second diode D2 is activated.

Figure 3:
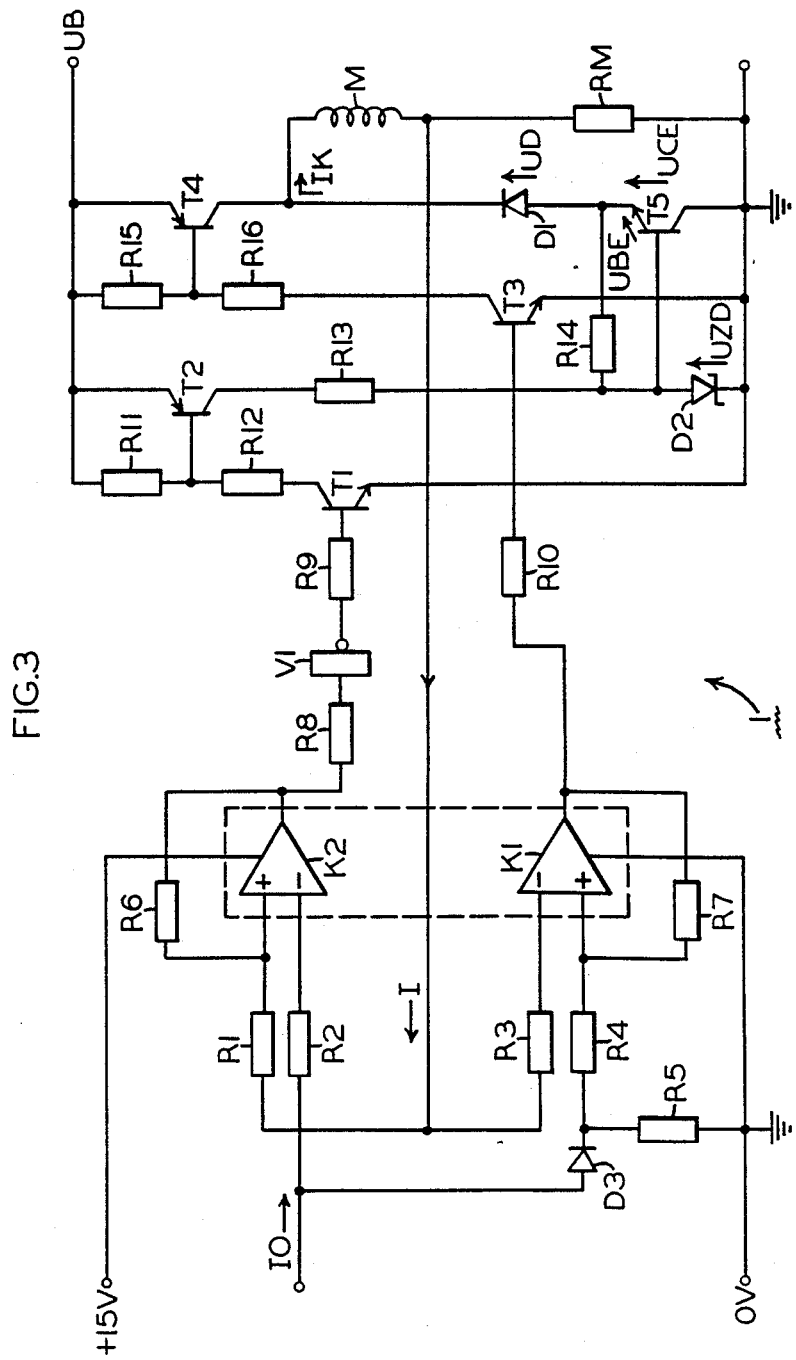
FIG. 3 shows a detailed electronic circuit diagram of the current regulating arrangement in accordance with the present invention.

In reviewing FIG. 3, there is shown a detailed schematic circuit diagram of the electronic counterpart of the components of FIG. 1.

As shown the comparators K1 and K2 are connected across a regulated supply voltage of +15V.

The two comparators K1 and K2 each take the form of an integrated circuit operational amplifier which may be a type LM 2904 linear integrated circuit manufactured by Motorola.

The nominal value of current I0 is fed via resistance R2 to a negative terminal of the comparator K2. Also, the nominal value of the current I0 is connected by a diode D3 and resistance R4 to a positive terminal of the comparator K1. The diode D3 is intended to maintain the operating points of the comparator at a given level. The resistance R5 serves to limit the amount of current flowing through the diode D3.

The actual value of the current I flowing through coil M is limited by the precision resistance RM which is connected to the positive terminal of the comparator K2 and is limited by the resistance R3 which is connected to a negative terminal of the controller K1. Both K1 and K2 have a feed back resistance R7 and R6 respectively for establishing the amount of hysteresis.

In order to determine a rapid decrease of the nominal value I0, the circuit operates in the following manner.

The positive terminal of the comparator K1 has a smaller nominal value I0 due to the voltage drop of the diode D3 than that conveyed to the negative terminal of the comparator K2.

The hysteresis effect of the comparator K1 is selected in such a way that the actual value at the positive terminal of the comparator K2 will remain smaller than the nominal value I0 at the negative terminal of the comparator even during small negative changes of the nominal value. The output terminal of the comparator K2 thus assumes a LOW condition. The forward voltage drop UD across the diode D1 will cause it to conduct current.

When a large negative change of the nominal value occurs, the nominal value I0 will decrease at the negative terminal of the comparator K2 at a rate much faster than the change of the actual value at the positive terminal of the comparator K2. This causes a more positive potential at the positive terminal of the comparator K2 than at the negative terminal for at least a limited period. For this duration of time, the output terminal of the comparator K2 assumes a high condition which causes a larger voltage drop UZD to the inductive load M. This causes a rapid decrease of the current flowing through the coil current I.

It is possible to detect the rapid change or drop in the coil current I by means of a differential amplifier. However, this prior method has been found to be less successful and it is preferred to employ the method shown and disclosed in FIG. 3.

The comparator K1 is connected by a resistor R10 to the base of an electrode transistor T3. The collector electrode of the transistor TB NPN is supplied with battery operating voltage UB by a pair of series connected resistors R15 and R16. The emitter electrode for the transistor T3 is directly connected to ground.

The switch S1 of FIG. 1 takes the form of a PNP transistor T4 in FIG. 3 which is controlled by transistor T3. The switching transistor T4 may be a type BDX 34 of power transistor manufactured by RCA. As shown in FIG. 1, it is connected in series with the inductive load M and the precision resistor RM. The control for the switch S1 or for the coil current I is accomplished by the operational amplifying comparator K1 in response to the differential between the nominal current value I0 and the actual current value I.

The terminal of the operational amplifying comparator K2 is connected by a pair of resistances R8 and R9 and an inverter V1 to the base electrode of a transistor T1. The inverter V1 is used for shaping and matching the NPN signal of the comparator K2 for the input of transistor T1. A type AEF 40106 manufactured by SGS can be used as the inverter circuit V1.

The base electrode of transistor T1 is connected to the battery voltage UB by a pair of series connected resistors R11 and R12. The transistor T1 is adapted to control a transistor T2 which has its emitter electrode connected to the battery voltage UB and its collector electrode connected to the ground by a series resistor R13 and Zener diode D2. The elements T1, T2, R11, R12, R13 constitute an electronic reversing switching circuit which is the counterpart of switch S2.

The collector electrode of transistor T4 is connected to a diode D1 which is in series with the emitter and collector electrodes of the transistor T5. The base electrode of transistor T5 is connected to the anode electrode of the Zener diode D2. The emitter electrode of the transistor T5 is connected to the anode of Zener diode D2, via a resistor R4. It is possible to use a transistor of type BDT 65 manufactured by Volvo.

During normal operation, when the value of the nominal current remains constant I0 or when only a minute change occurs in the nominal current value, the output terminal of the comparator K2 will be LOW or at zero (0) level. The inverter V1, the transistor T1 as well as the transistor T2 are in a conductive condition.

The potential on the anode of the Zener diode D2 is at approximately 0.7 V. The voltage, which is induced into the inductive load M by the shutting OFF of the transistor T4, causes the potential level at the emitter electrode of transistor T5 to reach a negative voltage value. When the voltage UE=1.4 V, transistor T5 will open and pick up the current cycle IK by the inductance. The current, which can be compared with that of FIG. 1, and the forward voltage UD1 for the first diode, will in this case become $$UD1 = UD + UCE.$$

The voltage UM across the inductive load M will increase by the voltage drop which depends on the current flowing through the measurement resistance RM, where RM=0.22.

When the comparator K2 senses a rapid decrease of the nominal current value I0, the comparator K2 will be toggled. The transistors T1 and T2 will be turned OFF, whereby the base electrode of transistor T5 will no longer be held at +0.7 V. The Zener diode D2 will be operated in the reverse direction whereby the base electrode potential of transistor T5 will decrease to UZD and the emitter electrode potential of transistor T5 will decrease to −UZD +UBE. The transistor T5 will assume the larger part of the current circuit IK. In this case, a forward voltage UD2 is comparable to that of FIG. 1. Thus, the voltage across the second diode D2 will be:

$$UD2 = UD + UBE + UZD.$$

The Zener voltage UZD is roughly 20 V. The coil current will be reduced with a high gradient with rapid changes occurring in the nominal current value I0.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A current controller for supplying current to an inductive load, such as, an electromagnetic coil of a solenoid comprising, a first comparator means connected to said electromagnetic coil for regulating the current supplied to said electromagnetic coil to a desired nominal value, a first switch means connected to said first comparator means and being turned ON and OFF by said first comparator means to cause voltage pulses to be conveyed to said electromagnetic coil, and a second comparator means connected to a second switch means which causes a first recovery diode to be connected to said electromagnetic coil during minute current changes and which causes a second recover diode to be connected to said electromagnetic coil during dramatic current changes.

2. The current controller, as defined in claim 1, wherein said second recovery diode has a higher forward voltage than said first recovery diode.

3. The current controller, as defined in claim 1, wherein said second recovery diode is a Zener diode.

4. The current controller, as defined in claim 1, wherein said first comparator means takes the form of an integrated circuit operational amplifier.

5. The current controller, as defined in 1, wherein said second comparator means takes the form of an integrated circuit operational amplifier.

6. The current controller, as defined in claim 1, wherein a precision resistor is connected in series with said electromagnetic coil.

7. The current controller, as defined in claim 1, wherein said first switching means is a power transistor.

8. The current controller, as defined in claim 7, wherein said power transistor is a PNP transistor.

9. The current controller, as defined in claim 1, wherein said second switching means is an electronic reversing switching circuit.

10. The current controller, as defined in claim 9, wherein said electronic reversing switching circuit includes a pair of transistors and a plurality of resistors.

* * * * *